United States Patent [19]

Schmidhammer et al.

[11] 3,898,176

[45] Aug. 5, 1975

[54] PROCESS FOR PREPARING MECHANICALLY RESISTANT CATALYSTS

[75] Inventors: Ludwig Schmidhammer; Siegfried Nitzsche, both of Burghausen, Germany

[73] Assignee: Wacker-Chemie GmbH, Munich, Germany

[22] Filed: Aug. 7, 1973

[21] Appl. No.: 386,466

[30] Foreign Application Priority Data
Aug. 8, 1972 Germany............................ 2239051

[52] U.S. Cl............... 252/428; 252/429 R; 252/430
[51] Int. Cl.²........................................... B01J 31/26
[58] Field of Search......... 252/426, 428, 429 R, 430

[56] References Cited
UNITED STATES PATENTS

| 2,479,451 | 8/1949 | Young.......................... 252/429 R X |
| 3,091,550 | 5/1963 | Doying.......................... 252/430 X |
| 3,389,092 | 6/1968 | Sanford et al. ..................... 252/430 |
| 3,502,217 | 3/1970 | Bruckner et al................ 252/430 X |

FOREIGN PATENTS OR APPLICATIONS 702,726    1/1965    Canada.............................. 252/428

OTHER PUBLICATIONS

Chevalier, et al., "Chemical Abstracts" Vol. 46, (1952), page 7257.

*Primary Examiner*—Patrick P. Garvin
*Attorney, Agent, or Firm*—Allison C. Collard

[57] ABSTRACT

Process for making mechanically resistant carrier catalysts which consists in mixing a catalytically active component, a surface-active inert carrier, and a hardenable organopolysiloxane in amount of 0.1 to 10% by weight, preferably 2 to 8% by weight, calculated on the carrier catalyst, shaping the mixture, and subsequently hardening the same.

4 Claims, No Drawings

PROCESS FOR PREPARING MECHANICALLY RESISTANT CATALYSTS

The present invention relates to the production of mechanically resistant carrier catalysts.

In all processes using fixed beds or fluidized beds, the mechanical resistance of the catalysts employed is of prime importance for the economy of the process. Decomposition of the catalyst results in short operational time, since the accompanying pressure drop makes in necessary to exchange the catalyst, although the activity of the catalyst may not yet be used up. A certain mechanical reinforcement may be brought about by the addition of water glass to catalysts which contain as carrier, e.g., aluminum oxide, silica gel, or pumice, but this incurs the disadvantage that the effectiveness of the catalyst diminished, since these binders glue together the active surface parts of the catalysts.

It is therefore the object of the present invention to provide a process for making mechanically stable catalysts free of the shortcomings of the known methods.

The invention relates to a process for making mechanically resistant carrier catalysts by mixing a catalytically active component, a surface-active inert carrier, and a hardenable organopolysiloxane in amounts of 0.1 to 10% by weight, preferably 2 to 8% by weight, calculated on the carrier catalyst, shaping the mixture, and subsequently hardening the same.

The use of the organopolysiloxanes imparts to the carrier catalyst an increased mechanical strength, without impairing its catalytical effectiveness.

The following elements and compounds may be used as active components according to the invention: Finely dispersed metals, e.g., aluminum, zinc, iron, cobalt, nickel, palladium, platinum, manganese, molybdenum, tungsten; oxides of the mentioned metals, as well as vanadium and titanium; salts, e.g. silicates, sulfates and halides, such as chorides of the mentioned metals, alkaline earth metal salts, for instance, calcium, barium salts, especially their halides and sulfates; also mercury and potassium salts, e.g., mercury-II-chloride, thallium chloride and thallium-III-chloride.

Examples for the surface-active inert carriers are activated charcoals, graphite coals, silicon carbide, silica gel, highly dispersed silicic acid, kieselgur, caolinite, alumino-silicates, zeolite and bentonites.

In general, the catalytically active components are used in amounts of 0.1 to 25% by weight of the total weight of active component plus the carrier.

We use as hardenable organopolysiloxanes e.g. ones which consist of (a) 0.1 to 10 mol% units of the formula $R_3SiO_{1/2}$, wherein each R is a methyl or phenyl radical; (b) 99.9 to 20 mol% units of the formula $R'_2SiO$, wherein each R' is vinyl, methyl, or phenyl, and, if desired, (c) units of the formula $R'SiO_{3/2}$, wherein R' is vinyl, methyl, or phenyl, wherein 2.0 to 3.5 mol siloxane units are present with vinyl groups per kilogram organopolysiloxane, having a viscosity of 200 to 20,000 cSt/25°C. (The amount of units (c) in mol% is found by the difference of the sum of units (a) and (b) present in mol% subtracted from 100). The hardening of these organopolysiloxane resins is effected by means of heating to temperatures of 140° – 250°C with radical forming compounds, such as dicumyl peroxide, cumolhydro peroxide, 2,2-bis-(tert.-butylperoxy)-butane, tert.-butylperlaurate, tert.-butyl perbenzoate and tert-butylhydroperoxide.

A further group of organopolysiloxane resins, which may be used following the concept of the invention, may be illustrated by the following formula $$R_xSi(OR'')_y(OH)_z \ \underline{O_{4-x-y-z}}\\ \phantom{R_xSi(OR'')_y(OH)_z \ }2$$

In this formula, R has the meaning stated above, R'' is an alkyl radical with 1–4 C-atoms, mostly the methyl- or ethyl radical, $x,y,z$, stands for 0.1, 2, or 3, with the provision that the sum of $x+y+z$ should not be greater than 3, the average value of $x$ being 0.9 – 1.7, the average value of $y$ and $z$ varying from 0.00 – 0.20, it being understood that both $y$ and $z$ should not be 0.00. It is desirable that the organopolysiloxane resins free of vinyl groups should not contain more than 30 mol% of units in which $x$ equals 2 or 3, and preferably not have a viscosity exceeding 1,000cSt/25°C in 50% by weight of toluene solution. Hardening of these organopolysiloxanes resins is carried out by heating to 90° – 250°C, if necessary with the simultaneous use of condensation catalysts such as conventionally used in the hardening of vinylfree organopolysiloxanes, e.g., triethanolamine titanate, lead-and/or zinc naphthate, and/or with application of superatmospheric pressure.

It is further possible to use organopolysiloxanes in powder form at room temperature. Preferred examples for these polysiloxanes hardenable by heating are hydrolysates or mixed hydrolysates which contain at least 0.1% by weight of Si-linked hydroxy groups and, in some cases, up to 3% by weight of SiOC-linked alkyl groups, e.g. methoxy-, ethoxy- and/or isopropoxy groups. A hydrolysate that can be used is methyltrichlorosilane, in a mixture with up to 5 mol% dimethyldichlorosilane; or methyltrimethoxysilane, if desired in a mixture with up to 5 mol% dimethyldiethoxysilane.

Other examples of heat hardenable organopolysiloxanes which are solid at room temperature are those containing at least 0.1% by weight hydroxy- groups linked to Si, on the average 0.3 to 1.2, preferably 1.1 phenyl- groups per Si-atom, and altogether a mean value of 0.9 to 1.7, preferably up to 1.1, SiC-linked organic groups per Si-atom. There may also be up to 3% by weight SiOC-linked alkyl groups, such as methoxy- ethoxy- and/or isopropoxy groups present in the compound. Apart from the phenyl groups, the other SiC-linked organic groups are usually methyl groups which are the ones easiest available.

The hardening of the organopolysiloxanes may be effected slowly, or in stages. For example, the temperature can start at about 70°–80°C and be raised up to about 200°C within three hours. The temperature may also be brought about by rapid rise to 250°–300°C within 30 – 60 minutes. The last mentioned method leads to foamy or porous structures. An acceleration of the hardening may be brought about, e.g., by aluminum acetylacetonate. In some cases the organopolysiloxane resins used according to the invention may contain before undergoing hardening, such solvents as are conventionally used in the processing of the resins. Examples of solvents of this type are hydrocarbons such as toluene, xylene, trimethylbenzene; chlorinated hydrocarbons, e.g., trichloroethylene; ether, such as di-n-butylether; alcohols, e.g., ethanol; and ketones, e.g., methylethylketone. Finally, the organopolysiloxanes used according to the invention may contain conventional additives such as heat stabilizing agents. The use of the organopolysiloxane resins in aqueous emulsion or dispersion is likewise within the scope of the invention.

A frequently used method for the preparation of carrier catalysts consists of applying the active component in solution to a carrier and afterwards removing the solvent. The obtained carrier catalyst is then mixed with the hardenable organopolysiloxanes and worked up to the known shapes of pellets, tablets, extruded or ball-shaped bodies. Subsequently the carriers are subjected to hardening operations, which cause crosslinking of the organopolysiloxanes.

On the other hand it is possible to mix the active components in powder form with the carrier and the organosiloxane and thus to arrive in a single operation at the catalyst masses capable of shaping and crosslinking.

Some special methods are known for the preparation of carrier catalysts from the carrier and the active component which provide good results. For instance, in some cases, a metal salt applied to the carrier surface is converted by reduction with known means into finely distributed metal. Carrier catalysts made in that manner are likewise useful in the process according to this invention. It is only necessary to follow up with the homogeneous admixture of the organopolysiloxanes and to proceed with the operations above described.

The carrier catalysts made according to the invention are used, e.g., in the chlorination of hydrocarbons or chlorinated hydrocarbons, in the oxy-chlorination of hydrocarbons or chlorinated hydrocarbons, in the dehydrohalogenation of halogen hydrocarbons, in the hydrogenation or dehydrogenation of organic compounds with or without functional groups, e.g., for example, of aliphatic, cyclic and heterocyclic hydrocarbons, nitro groups, carboxylic groups, and in oxidation processes of inorganic or organic compounds on a large industrial scale. They can be used in a fixed bed, as well as in a fluidized bed.

The process according to the invention will now be more fully described in a number of examples which are given by way of illustration and not of limitation.

EXAMPLE 1

100 parts of powdered, activated aluminum oxide, which had been impregnated with 18% by weight of copper chloride is mixed with 5 parts by weight of a methylpolysiloxane resin having a softening point of 80°C; the ratio of methyl groups to silicon atoms is 1.1 : 1, the content in ethoxy groups 0.8% by weight; the resin was prepared from methyltrichlorosilane and dimethyl-dichlorosilane in the molar ratio of 95:5 by adding to a refluxed solution of the chlorosilanes in toluene, a mixture of water and ethanol in about equal molar parts while maintaining the reflux and then working up the obtained hydrolysate. Mixing proceeds until a homogeneous mass results which is then compressed to tablets of 4 × 6 mm. in size. The tablets were subsequently hardened for 30 minutes at 250°C. The cracking (or bursting) pressure of the shaped catalyst is above 20 kp per tablet, the specific surface 180 mm²/g.

COMPARISON EXAMPLE

Tablets of a catalyst made in the same manner as described in example 1, but without addition of the organopolysiloxane, have a cracking pressure of 10 kp per tablet at a specific surface of 180 m²/g.

EXAMPLE 2

100 parts by weight of powdered silica gel on which about 5% by weight of palladium chloride had been precipitated, are homogeneously mixed with 1 part by weight of a linear organopolysiloxane; the latter consists of 40 mol% diphenyl-, 20 mol% dimethyl-, 36 mol% vinylmethyl-and 4 mol% trimethylsiloxane units with a viscosity of 5,000 cst/25°C; the mixture also contained 2% by weight of dicumyl peroxide calculated on the weight of the organopolysiloxane; in homogeneous mixture therewith. The mass is compressed to tablets of 4 × 6 mm. The abrasion resistance is 90% determined according to the SCC abrasion test.

COMPARISON EXAMPLE

A silica gel catalyst made in the manner described in example 2, but without addition of organopolysiloxane, had an abrasion resistance of only 60%.

EXAMPLE 3

100 parts by weight of activated charcoal, impregnated with 15% by weight of barium chloride, are mixed with 100 parts of trichloroethylene containing 8% of the organopolysiloxane used according to example 2. The so obtained pasty mass is extruded and cut into pellets of the size 3 × 5 mm. The pellets are then hardened by heating for 3 hours at 150°C and for 2 more hours at 250°C. According to the SCC abrasion test, they have an abrasion resistance of 85%.

COMPARISON EXAMPLE

A carrier catalyst made from activated charcoal without addition of organopolysiloxane cannot be subjected to extrusion.

EXAMPLE 4

100 parts by weight of aluminum oxide are homogeneously mixed with 10 parts of cobalt oxide and 6 parts of an organopolysiloxane as used in example 1, and compressed to tablets of the size 4 × 6 mm. The cracking pressure of the tablets is 17 kp tablet, the specific surface 170 m²/g.

COMPARISON EXAMPLE

A similarly made catalyst without addition of the organopolysiloxane has a cracking pressure of 5 kp/tablet at a specific surface of 170 m²/g.

EXAMPLE 5

Over 500 cc of a catalyst made according to example 3, 1 mol 1-2-dichloroethane are subjected to dechlorination hourly at a temperature of 280°C and an excess pressure of 1 atm. With an 80% rate of decomposition, the yield is 0.8 mol vinyl chloride and 0.8mol HCl.

while only a few examples of the present invention have been described, it is obvious that many changes and variations can be made without departing from the spirit and scope of the invention.

What is claimed is:

1. A process for making a mechanically resistant catalyst supported upon a high surface area inert carrier which consists in mixing the catalytically effective component, particles of said carrier, and a heat hardenable hydroxyhydrocarbylpolysiloxane which does not impair the catalytic effectiveness of said catalytically active component, in an amount of 0.1 to 10% by weight, calculated on the catalyst component plus carrier, shaping the mixture into a catalyst body, and subsequently hardening the same by heating to 70° to 300°C.

2. The process according to claim 1, wherein the organopolysiloxane amounts to 2 to 8% by weight calculated on the weight of the carrier plus catalyst.

3. The process according to claim 1, wherein the organopolysiloxane contains units of the formula $$R_x Si(OR'')_y (OH)_z \frac{O_{4-x-y-z}}{2}$$

in which R stands for methyl or phenyl, R'' is an alkyl radical with 1–4 C-atoms, $x, y, z$, stand for 0, 1, 2, or 3, wherein the sum of $x+y+z$ is not greater than 3, the mean value of $x$ being 0.9–1.7, the mean value of $y$ and $z$ varying from 0.00 – 0.20, wherein $y$ or $z$ is greater than 0.00.

4. The process according to claim 1, wherein the hardening of the products is carried out in stages, the first stage raising the temperature from about 70° to about 200°C over a period of several hours, the second stage causing a rapid rise from about 250°C to 300°C within 30–60 minutes.

* * * * *